United States Patent
Shankar et al.

(10) Patent No.: US 6,768,733 B1
(45) Date of Patent: Jul. 27, 2004

(54) COMMUNICATING VOICE OVER A PACKET-SWITCHING NETWORK

(75) Inventors: Udaya Shankar, Danville, CA (US); Andrew West, Leesburg, VA (US); Douglas Shriver, Manassas, VA (US); Fred R. Rednor, Arlington, VA (US); David Auerbach, Reston, VA (US); David Hughes, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/409,994

(22) Filed: Apr. 8, 2003

Related U.S. Application Data (63) Continuation of application No. 09/163,312, filed on Sep. 30, 1998, now Pat. No. 6,570,869.

(51) Int. Cl.[7] ............................................... H04L 12/64
(52) U.S. Cl. ..................................... 370/352; 370/356
(58) Field of Search ................................. 370/352–356

(56) References Cited

U.S. PATENT DOCUMENTS

| | | |
|---|---|---|
| 4,511,762 A | 4/1985 | Stockdale |
| 4,979,207 A | 12/1990 | Baum et al. |
| 5,027,388 A | 6/1991 | Bradshaw et al. |
| 5,182,748 A | 1/1993 | Sakata et al. |
| 5,208,809 A | 5/1993 | Fergeson et al. |
| 5,239,542 A | 8/1993 | Breidenstein et al. |
| RE34,536 E | 2/1994 | Frimmel, Jr. |
| 5,325,426 A | 6/1994 | Held |
| 5,414,762 A | 5/1995 | Flisik et al. |
| 5,420,916 A | 5/1995 | Sekiguchi |
| 5,426,694 A | 6/1995 | Hebert |
| 5,428,771 A | 6/1995 | Daniels et al. |
| 5,440,741 A | 8/1995 | Morales et al. |
| 5,450,483 A | 9/1995 | Williams |
| 5,517,563 A | 5/1996 | Norell |
| 5,530,434 A | 6/1996 | Kanda |
| 5,535,336 A | 7/1996 | Smith et al. |
| 5,535,373 A | 7/1996 | Olnowich |
| 5,537,679 A | 7/1996 | Crosbie et al. |
| 5,539,787 A | 7/1996 | Nakano et al. |
| 5,543,785 A | 8/1996 | Vatt et al. |

(List continued on next page.)

FOREIGN PATENT DOCUMENTS

| | | |
|---|---|---|
| WO | WO 95/31057 A1 | 11/1995 |
| WO | WO 97/09807 A1 | 3/1997 |
| WO | WO 97/09808 A1 | 3/1997 |

OTHER PUBLICATIONS

Low, Colin, "The Internet Telephony Red Herring," 1996, IEEE, pp. 72–80.

*Primary Examiner*—Melvin Marcelo
(74) *Attorney, Agent, or Firm*—Hickman Palermo Truong & Becker LLP; Edward A. Becker (57) ABSTRACT

Communicating voice over a packet-switching network is implemented on a telecommunications network that includes the packet-switching network, two coding units coupled to the packet-switching network and to an originating node and a terminating node, respectively, and at least one signaling apparatus. The first of the two coding units is configured to extract signaling data associated with the voice call and transmit the signaling data and its network address to the signaling apparatus. Signaling data for establishing the voice call is received by the signaling apparatus, and a network address of the coding unit in the packet-switching network is obtained. The second coding unit is controlled to establish a bearer channel with the first coding unit for carrying the voice data through the packet-switching network, based on the network address.

32 Claims, 5 Drawing Sheets

U.S. PATENT DOCUMENTS

| | | | |
|---|---|---|---|
| 5,546,450 A | 8/1996 | Suthard et al. | |
| 5,546,453 A | 8/1996 | Hebert | |
| 5,550,820 A | 8/1996 | Baran | |
| 5,557,652 A | 9/1996 | Jonsson | |
| 5,581,558 A | 12/1996 | Horney, II et al. | |
| 5,610,910 A | 3/1997 | Focsaneanu et al. | |
| 5,703,876 A | 12/1997 | Christie | |
| 5,793,771 A | 8/1998 | Darland et al. | |
| 5,815,501 A | 9/1998 | Gaddis et al. | |
| 5,828,666 A | 10/1998 | Focsaneanu et al. | |
| 5,838,781 A | 11/1998 | Isaksson | |
| 5,848,070 A | 12/1998 | Durvaux et al. | |
| 5,862,339 A | 1/1999 | Bonnaure et al. | |
| 5,878,224 A | 3/1999 | Smith | |
| 5,889,762 A | 3/1999 | Pajuvirta et al. | |
| 5,898,839 A | 4/1999 | Berteau | |
| 5,933,490 A | 8/1999 | White et al. | |
| 5,987,118 A | 11/1999 | Dickerman et al. | |
| 5,991,292 A | 11/1999 | Focsaneanu et al. | |
| 6,018,519 A | 1/2000 | Ginzboorg | |
| 6,021,126 A | 2/2000 | White et al. | |
| 6,084,892 A | 7/2000 | Benash et al. | |
| 6,111,893 A | 8/2000 | Volftsun et al. | |
| 6,112,305 A | 8/2000 | Dancs et al. | |
| 6,125,127 A | 9/2000 | Smith, Jr. | |
| 6,151,390 A | 11/2000 | Volftsun et al. | |
| 6,205,212 B1 | 3/2001 | Swale | |
| 6,212,188 B1 | 4/2001 | Rochberger et al. | |
| 6,570,869 B1 * | 5/2003 | Shankar et al. | 370/352 |
| 6,658,022 B1 * | 12/2003 | West et al. | 370/467 |

* cited by examiner

COMMUNICATING VOICE OVER A PACKET-SWITCHING NETWORK

RELATED APPLICATION

This application is a continuation of and claims benefit of U.S. Non Provisional Application entitled "Communicating Voice Over a Packet-Switching Network", Ser. No. 09/163,312, filed Sep. 30, 1998 now U.S. Pat. No. 6,570,869 B1. The entire contents of this prior application are hereby incorporated by reference in its entirety for all purposes.

FIELD OF THE INVENTION

The present invention relates to telecommunications and more particularly to packet switched networking systems capable of carrying voice traffic.

BACKGROUND OF THE INVENTION

Recent legislative changes in the United States have promoted competition in the telecommunication industry and spurred demand for new services at lower prices. These trends are pressuring major telecommunications carriers to increase capacity while reducing the cost of providing service. Consequently, major carriers around the world are looking to packet technologies, such as Internet Protocol (IP), frame relay, and Asynchronous Transfer Mode (ATM), to replace circuit-switched technologies in the Public Switched Telephone Network (PSTN) for providing voice capability. In addition, IP, frame relay, ATM, and other packet-based technologies offer narrow-band and broad-band services to selected customers on the same network, providing the same platform for integrated voice, data, and video services from low bandwidth to very high bandwidths.

Over the decades, however, major voice carriers have invested heavily in developing a Signaling System 7 (SS7) signaling and switching infrastructure to offer reliable telephone service. This infrastructure includes countless systems for billing, provisioning, maintenance, and databases that are compatible only with SS7. These systems are commonly referred to "legacy systems," a term that also includes other proprietary protocols such as ISDN_PRI, DPNSS, ISUP, TUP, NUP, H.323, and SIP. Due to the substantial investment in the legacy systems, it is desirable to keep the legacy systems in operation, yet still take advantage of the newer packet technologies.

These legacy systems, however, do not handle the protocols for the newer packet-switching networks, and, due to the age of many of the legacy systems, it is difficult and expensive to upgrade or replace the legacy systems to support the newer packet-switching protocols.

Accordingly, there exists a need for establishing and carrying voice calls that are originated or terminated by legacy systems over a packet-switching network. There is also a need for a way to seamlessly integrate legacy SS7-type systems and newer packet-switching networks.

Moreover, certain demographic trends are motivating telephone call carriers to integrate their systems with packet-switched networks. Certain countries are known to generate an above-average amount of long-distance telephone traffic. For example, residents of Israel are known to consume long-distance telephone services at a rate far greater than the average of residents in other industrialized nations. Long-distance telephone services carried over the PSTN are expensive. Voice calls carried over the globally accessible packet-switched network known as the Internet, however, are generally free. Accordingly, local telephone companies and other call access providers in certain countries are acutely interested in finding ways to integrate the PSTN with the Internet.

DESCRIPTION OF THE DRAWINGS

The present invention is illustrated by way of example, and not by way of limitation, in the figures of the accompanying drawings and in which like reference numerals refer to similar elements and in which:

FIG. 5(*a*) is a diagram of another packet-switching network carrying voice signals;

FIG. 5(*b*) is a diagram of still another packet-switching network carrying voice signals; and FIG. 5(*c*) is a diagram of yet another packet-switching network carrying voice signals.

DESCRIPTION OF THE PREFERRED EMBODIMENT

A telecommunications method, network, and devices for carrying voice over a packet-switching network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Network Overview

Figure 1:
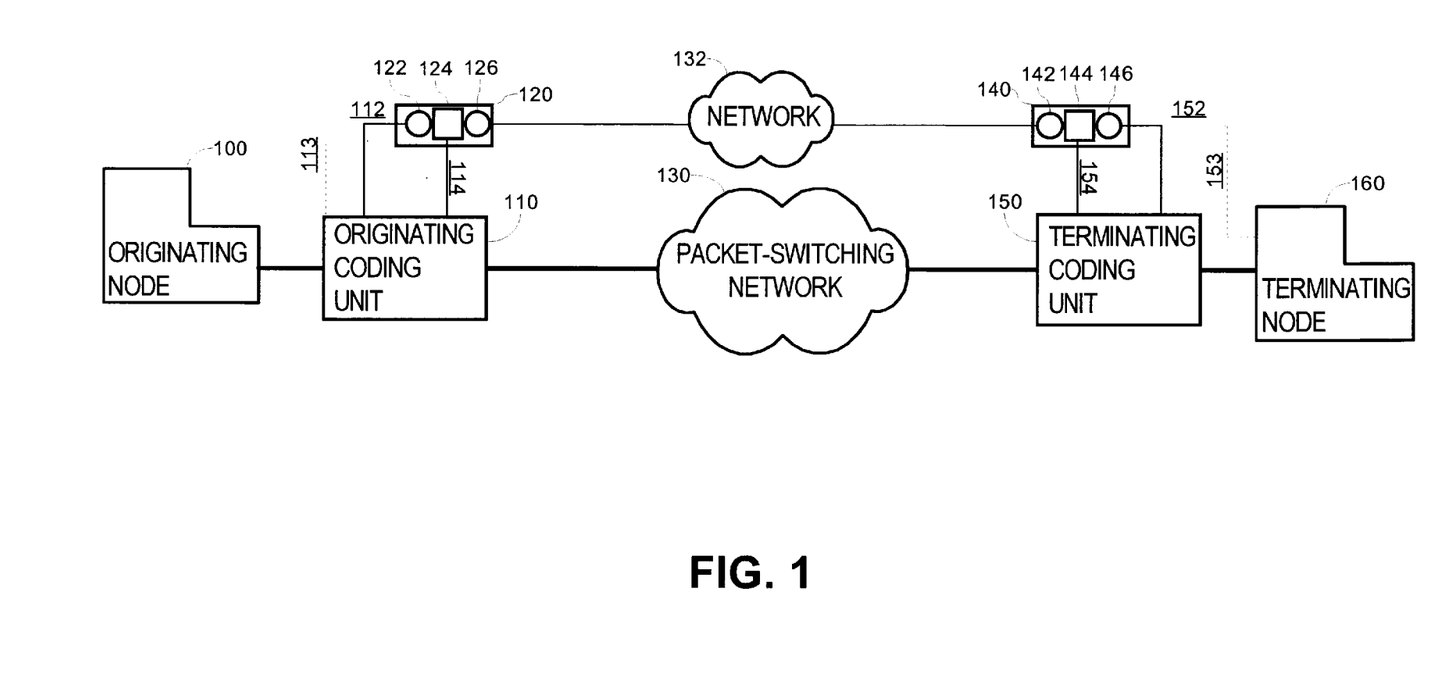
FIG. 1 is a diagram of a packet-switching network carrying voice signals.

FIG. 1 depicts a telecommunications network that carries voice calls from an originating node 100 to a terminating node 160 over a packet-switching network 130, in which the voice signaling processing is separated from the processing of the voice data. More specifically, the voice signaling aspects of establishing and handling voice calls over packet-switching network 130 are provided by one or more signaling units, for example, the originating signaling unit 120 and the terminating signaling unit 140. The aspects relating to the voice traffic of a voice call are handled by one or more coding units, for example, the originating coding unit 110 and the terminating coding unit 150.

For purposes of illustration, FIG. 1 depicts a network configuration in which the originating coding 110 and the terminating coding unit 150 are coupled to respective signaling units, namely originating signaling unit 120 and terminating signaling unit 140. As described in more detail hereinafter, however, the signaling processing functionality for the originating signaling unit 120 and the terminating signaling unit 140 can be incorporated into a single signaling unit. Even though the signaling units and the coding units are generally described herein in terms of being separate devices, which can be geographically remote from one another, a signaling unit and a coding unit may also be incorporated as respective subsystems of a single computer system. Thus, the present invention is not limited to the configuration depicted in FIG. 1.

Originating node 100 can be implemented as a Private Branch eXchange (PBX), a telephone switch, a "smart phone" capable of generating voice calls, a wireless PBX, or a legacy telecommunications system. Similarly, terminating node 160 can also be a PBX, telephone switch, telephone, a wireless PBX, or legacy telecommunications system.

Packet-switching network 130 is a network designed to carry information in the form of digital data packets. In such a network, data to be transmitted is subdivided into one or more individual packets of data, each having a unique identifier and a destination address. Each packet is individually routed or switched to the destination address, and individual packets for a single body of data may traverse the packet-switching network by different routes. In fact, the individual packets may even arrive at the destination in a different order from which they were shipped, to be reassembled at the destination in the proper sequence based on the packet identifiers. Packet-switching network 130 can be implemented as an IP network, an ATM network, a frame relay network, or by any other packet-switching technology. In some implementations, the packet-switching network 130 may even be overlaid on the PSTN. One example of packet-switching network 130 is the global packet-switching network known as the Internet.

The telecommunication network of FIG. 1 includes an originating coding unit 110 and a terminating coding unit 150 functioning as gateways between the respective originating node 100 and the terminating node 160 and the packet-switching network 130. The originating coding unit 110, coupled to the originating node 100 by a trunk such as a T1 line or an E1 line, converts multiplexed voice data produced by originating node 100 into packets for the packet-switching network 130. The voice data produced by originating node 100 may be, for example, Time Division Multiple Access (TDMA) and Code Division Multiple Access (CDMA) information. The originating coding unit 110 can also be configured to support voice data encoding and decoding as well as associated functions such as echo cancellation, voice activity detection, and voice compression. Similarly, the terminating coding unit 150 is also configured to convert between multiplexed voice data and voice data packets as well as the encoding and decoding functions.

While a major purpose of the origination coding unit 110 is to terminate the bearers from PBX 100, in some embodiments the originating coding unit 110 is also configured to extract or "groom" the signaling data associated with the incoming voice call from originating node 100. This signaling data is then transmitted or "backhauled" over a backhaul signaling link 112 to a signaling apparatus such as originating signaling unit 120. The backhaul signaling link 112 can be implemented in various ways, including by an IP connection over Ethernet or other Local Area Network (LAN) technology such as token ring. The signaling data in the voice call can be Channel Associated Signaling (CAS), in which the signaling bits are isolated, time stamped, packaged in IP or ATM packets, and shipped to the originating signaling unit 120.

Similarly, the terminating coding unit 150 is coupled by a backhaul signaling link 152 to a signaling apparatus such as terminating signaling unit 140. The terminating coding unit 150 is configured for receiving signaling messages from the terminating signaling unit 140 and appropriately transmitting them to the terminating node 160. Preferably, the coding units are implemented to be symmetrical, supporting the functionality of both the originating coding unit 110 and the terminating coding unit 150 as described herein. In fact, a single coding unit can performing the both the originating and terminating functionality for the same call.

Alternatively, the signaling data can be Common Channel Signaling (CCS), such as an ISDN PRI, in which case the signaling data is directly transported to the originating signaling unit 120. In an embodiment wherein originating node 100 implements a CCS signaling such as U.S. SS7 signaling, the signaling data can be directly transmitted over link 113 to the originating signaling unit 120 bypassing the originating coding unit 110 entirely. Similarly, when terminating node 160 implements such signaling, the signaling data can be directly transmitted over link 153 from the terminating signaling unit 140 to the terminating node 160, bypassing the terminating coding unit 150. By these techniques, the originating signaling apparatus 120 is advantageously capable of receiving the signaling data associated with the voice call in a flexible manner, suitable for interfacing with diverse legacy systems.

The originating signaling unit 120 and the terminating signaling unit 140 implement a "virtual switch" and are responsible for processing and routing the signaling messages that are exchanged to set up and tear down a voice connection. Thus, the signaling units perform such functions as call resolution, call routing, bearer selection, and generation of call detail records (CDRs) for billing management. In one embodiment, the signaling units also convert the legacy protocols of the originating node 100 and the terminating node 160, such as DPNSS, ISDN_PRI, SS7/C7 (including ISUPs, TUPs, and NUPs), H.323,SIP, or CAS, into messages for communicating with one another and for controlling a coding unit over control links 114 and 154. Control links 114 and 154 can be implemented over IP or ATM and, in fact, on the same channel as the respective backhaul signaling link 112 and 152, respectively. Through the control link, a coding unit is controlled by a signaling unit, for example, to establish a bearer channel for the voice data over the packet-switching network 130.

In the configuration depicted in FIG. 1, a voice call from originating node 100 is received by the originating coding unit 110, which, if necessary, extracts the signaling data associated with the voice call and transmits the signaling data over the backhaul signaling link 112 to originating signaling unit 120. In response, the originating signaling unit 120 obtains the network address of the originating coding unit 110 within the packet-switching network 130 by accessing configuration data stored on the originating signaling unit 120, by querying the originating coding unit 110 over the control link 114, or by inquiring another computer system (not shown) such as domain name server (DNS).

Next, the originating signaling unit 120 determines which terminating signaling unit 140 should receive the call by accessing internal routing tables or querying external systems. After the originating signaling unit 120 has performed this call routing capability, the originating signaling unit 120 transmits a signaling message, including information for establishing the voice and the network address of the originating coding unit 110, through network 132 to terminating signaling unit 140.

In response, the terminating signaling unit 140 determines which bearer should receive the call. After performing the bearer selection, the terminating signaling unit 140 controls the terminating coding unit 150 to establish a bearer channel for the voice through packet-switching network 130 and repackages the signaling messages for terminating node 160 over backhaul signaling link 152. In this manner, a voice call that is originated from a legacy system 100 or terminated by a legacy system 160 is seamlessly established over the packet-switching network 130 without having to upgrade or replace the legacy systems.

Hardware Overview

In a preferred embodiment, the signaling units are implemented by protocol converters that are configured to act as a virtual switch, but in alternative embodiments, especially where protocol conversion is not required, the signaling units are implemented directly as a virtual switch. A protocol converter is a telecommunications device capable of processing and converting at least those messages for establishing a connection between different protocols. For example, a protocol converter can convert messages between the DPNSS protocol and the ISDN protocol. In one configuration, the protocol converters are coupled to signaling network 132, which can be the same as the packet-switching network 130, and communicate with each other according to a common protocol regardless of the protocol of the respective legacy originating and terminating nodes. Consequently, legacy systems employing different protocols can communicate with one another voice over a packet-switching network.

In a preferred embodiment, protocol converters that implement originating signaling unit 120 and the terminating signaling unit 140 each comprise three abstract machine components that are instantiated for each call handled by the protocol converter. These abstract machine components are referred to as an originating call control (OCC) 122, a universal call model (UCM) 124, and a terminating call control (TCC) 126. The originating call control (OCC) 122, instantiated at the start of the call, converts signaling messages between the protocol of the originating side, for example, DPNSS, and a non-protocol specific universal protocol.

The universal call model (UCM) 124, typically instantiated at the start of the call, handles calls in the converted universal protocol, arranges for messages to be routed ultimately to the other protocol converter, and controls the originating coding unit 110 over a control link 114. The control link 114 can be implemented in various ways, including by an IP connection over a LAN. In an alternative embodiment, only two abstract machine components for the OCC 122 and the TCC 126 are implemented, with the functionality for the UCM 124 being distributed over the OCC 122 and the TCC 126.

The terminating call control (TCC) 126, typically instantiated after routing analysis has determined the route, converts signaling messages between the universal protocol and the protocol that provides connectivity to the terminating signaling unit 140, which may in fact be different from the protocol of the terminating node 160. For the example, the protocol of the terminating signaling unit can be an extension of Integrated Services Digital Network User Part (ISUP), described in more detail hereinafter and referred to as "XISUP", while the protocol of the terminating node 160 is a legacy protocol such as DPNSS. Likewise, the protocol converter that implements the terminating signaling unit 140 includes an OCC 142, a UCM 144, and a TCC 146.

One implementation of a protocol converter is described in more detail in the commonly assigned, co-pending U.S. patent application Ser. No. 08/904,295 entitled "Universal Protocol Conversion," filed on Jul. 31, 1997 by Lev Volftsun, Clay H. Neighbors, David S. Turvene, Fred R. Rednor, Anatoly V. Boshkin, and Mikhail Rabinovitch, now U.S. Pat. No. 6,111,893 the entire contents of which are hereby incorporated by reference as if fully set forth herein. The above-referenced patent document discloses structural and functional details of an embodiment of a protocol converter that can be used to implement the originating signaling unit 120 and terminating signaling unit 140. For purposes of context in this document, however, an overview of such structures and functions in an alternative embodiment is now provided.

Figure 2:
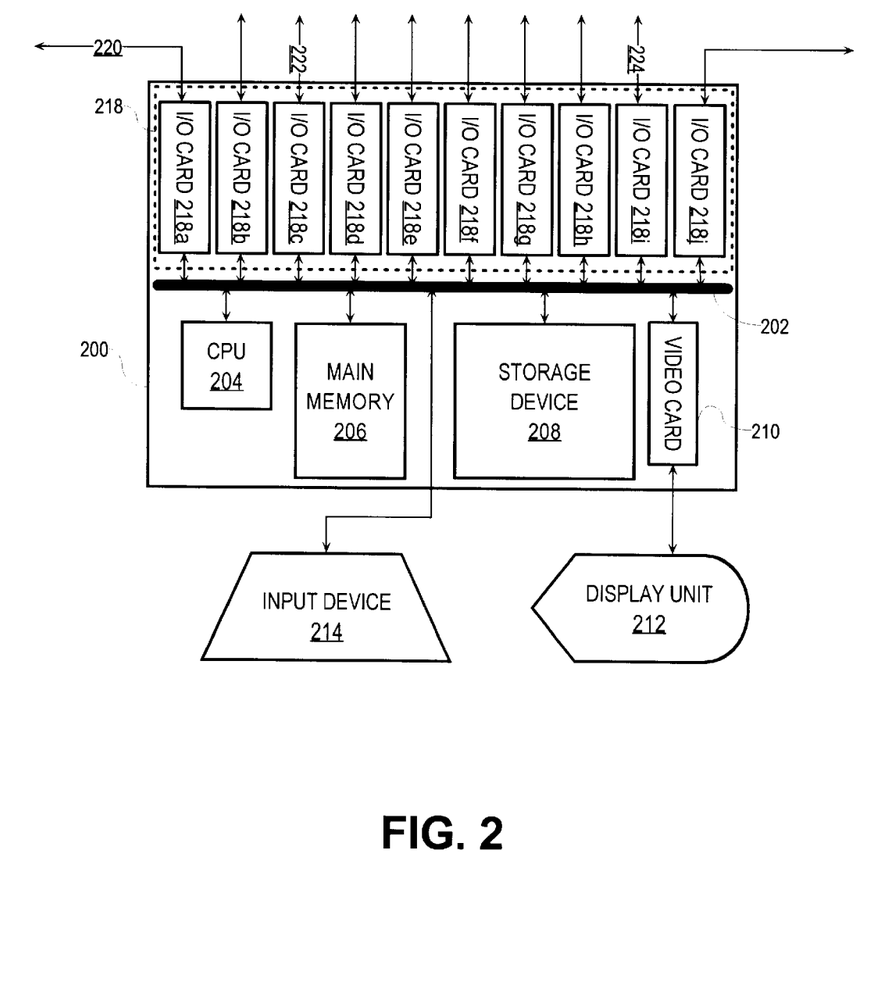
FIG. 2 is a block diagram of a signaling unit.

Referring to FIG. 2, the hardware components, computer system 200, of a protocol converter include a bus 202 or other communication mechanism for communicating information between internal components of the computer system 200. A central processing unit ("CPU") 204, comprising one or more processors, is coupled with bus 202 for processing information. Computer system 200 also includes a main memory 206 coupled to bus 202 for storing information and instructions to be executed by CPU 204. Main memory 206 typically includes a random access memory ("RAM") or other dynamic storage device, for storing temporary variables or other intermediate information during execution of instructions to be executed by CPU 204. Main memory 206 may also include a read only memory ("ROM") or other static storage device for storing static information and instructions for CPU 204. A storage device 208, such as a magnetic disk, magnetic tape, or optical disk, is provided and coupled to bus 202 for storing information and instructions.

In some implementations, computer system 200 includes a video card 210 coupled to bus 202 for controlling display unit 212, such as a cathode ray tube (CRT), a liquid crystal display (LCD), a video monitor or other display device, to display information to a computer user. An input device 214 is coupled to bus 202 for communicating information and command selections from a user to CPU 204. Typically an input device includes a keyboard with alphanumeric, symbolic, and cursor direction keys for receiving input from a user in the form of commands and data entry and communicating the input to CPU 204. The input device typically includes a cursor control input device, such as a mouse or a trackball, integral with or separate from the keyboard, for controlling cursor movement on display unit 212, and communicating direction information and command selections to CPU 204. A cursor control input device typically has two degrees of freedom in two axes, a first axis (e.g., x) and a second axis (e.g., y), that allows the device to specify positions in a plane. In other implementations, these devices are connected to the computer system via a local area network such as Ethernet.

Computer system 200 also includes a communication interface 218 coupled to bus 202 and comprising, for example, a plurality of I/O cards 218a through 218j. Ten I/O cards 218a through 218j are shown in FIG. 2, but any number of I/O cards, modems, transceivers, or other I/O devices may be used. Communication interface 218 provides a two-way data communication coupling to one or more coding units and zero or more other signaling units. Some of the I/O cards 218a–218j can be coupled directly to SS7 or DPNSS links via multiplexer/digital cross connect (not shown).

At least one of the I/O cards, for example I/O card 218a, is coupled to a coding unit through control link 220. Communication interface 218 may include an integrated services digital network (ISDN) card, terminal adapter, or modem for providing a data communication connection to a corresponding type of telephone line. As another example, communication interface 218 may include a local area network (LAN) card to provide a data communication connection to a compatible LAN, for example an Ethernet network. Wireless links, such as infrared, for communication interface 218 may also be implemented. In any such implementation, communication interface 218 sends and receives electrical, electromagnetic or optical signals that carry digital or analog data streams representing various types of information, in the form of carrier waves transporting the information.

This configuration enables the use of a computer system 200 for establishing voice connections in a packet-switching network. For example, such functionality is provided by computer system 200 in response to CPU 204 executing one or more sequences of one or more instructions arranged in main memory 206. Such instructions may be written into main memory 206 from another computer-readable medium, such as storage device 208. Execution of the sequences of instructions contained in main memory 206 causes CPU 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to CPU 204 for execution. Such a medium may take many forms, including but not limited to non-volatile media, volatile media, and transmission media. Non-volatile media include, for example, optical or magnetic disks, such as storage device 208. Volatile media include dynamic memory, such as main memory 206. Transmission media include coaxial cables, copper wire and fiber optics, including the wires that constitute bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to CPU 204 for execution. For example, the instructions may initially be borne on a magnetic disk of a remote computer and downloaded to computer system 202. The remote computer can load the instructions into its dynamic memory and send the instructions over a telephone line using a modem. A communications interface 218 local to computer system 200 can receive the data on a telephone line or other network or telecommunication link and place the data on bus 202. Bus 202 carries the data to main memory 206, from which CPU 204 retrieves and executes the instructions. The instructions received by main memory 206 may optionally be stored on storage device 208 either before or after execution by CPU 204. The received instructions may be executed by CPU 204 as it is received, and/or stored in storage device 208, or other non-volatile storage for later execution. In this manner, computer system 200 may obtain application code in the form of a carrier wave.

Software Architecture

Figure 3:
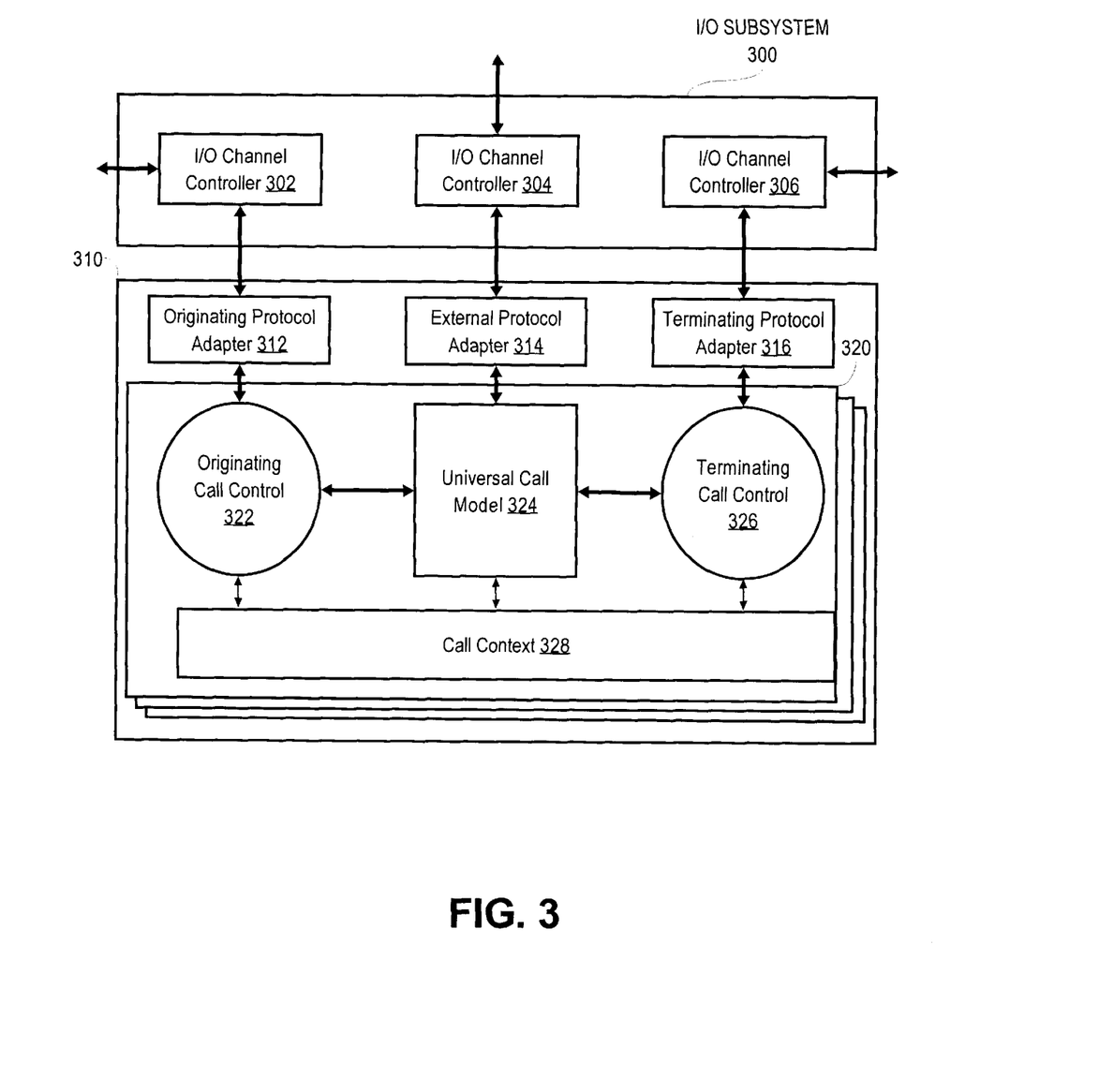
FIG. 3 is a block diagram of a software architecture of a signaling unit.

FIG. 3 schematically illustrates a software architecture relating to protocol conversion implemented on a computer system 200 of a protocol converter that implements originating signaling unit 120 and terminating signaling unit 140. The software architecture includes an I/O subsystem 300 for handing OSI Layer 2 (data link layer) messages and a protocol conversion engine 310 for handling messages at OSI Layer 3 (network layer). I/O subsystem 300, containing I/O channel controllers 302, 304, and 306, is configured for handling incoming connection requests and other incoming messages. For example, I/O subsystem 300 can convert OSI Layer 2 frames and packets that transport the message into an OSI Layer 3 networking protocol data unit, which is a populated data structure that represents the contents of the messages. Specifically, I/O subsystem 300 may be configured to convert LAP-D (Link Access Protocol-D) frames or Ethernet frames into protocol data units. Moreover, the I/O subsystem 300 is also responsible for converting protocol data units generated by the protocol conversion engine 310 into frames and packets as appropriate for transmission in the telecommunications network. Each I/O channel controller 302, 304, and 306 is responsible for messages from a network channel handled by a corresponding I/O card of communications interface 218.

The protocol conversion engine 310 includes a plurality of protocol adapters, implemented to support respective protocols or protocol families, and a number of call instances corresponding to each active call. A protocol adapter is a software module responsible for interfacing the protocol conversion engine 310 with the I/O subsystem 300. Specifically, a protocol adapter, when loaded and executed, is configured to connect with I/O subsystem 300 in order to route protocol-specific messages between an I/O channel and the appropriate call instance. Multiple instances of the same protocol adapter may be loaded and executed, each of which is associated with a respective I/O channel. Although the protocol adapters are fundamentally bi-directional, it is convenient to refer to an originating protocol adapter 312, an external protocol adapter 314, and a terminating protocol adapter 316, based on their particular function during a call. Thus, a protocol adapter can be employed as an originating protocol adapter 312 for one call and as a terminating protocol adapter 316 for another call.

An originating protocol adapter 312 is capable of decoding an incoming message to determine the call with which the message is associated. Each message transmitted on a signaling channel contains a protocol-dependent value that serves to disambiguate messages for different calls from the same logical signaling channel. Every telecommunications protocol provides some means for matching up a message with an associated call, for example, a specific call identifier embedded in the message (e.g., the Call Reference field used in ISDN_PRI) or the bearer channel identifier (e.g. with DPNSS and SS7/ISUP), but the present invention, which is capable of supporting many different protocols, is not limited to any particular means of matching up messages with the associated calls. Also, each call is identified internally with a unique integer identifier for the signaling unit, referred to as a "Global Call Reference," which is generated when the call is first instantiated. The Global Call Reference distinguishes simultaneously handled calls from one another. When concatenated with a network or other identifier of the signaling unit, the Global Call Reference serves to create a Universal Call Reference for the call that is unique for the network.

Accordingly, the originating protocol adapter 312 is configured to associate the Global Call Reference with a corresponding call instance 320. The corresponding call instance 320 is responsible for processing the call, including converting, if necessary, the protocol from the originating side to be compatible with the protocol at the terminating side. If the originating protocol adapter 312 can locate the corresponding call instance 320 for the message, then the protocol adapter 312 routes the message to the call instance 320 for further processing as described hereinafter. On the other hand, the originating protocol adapter 312 may not be able to find the corresponding call instance 320, for example, because the message is the first message pertaining to a call. In that case, the originating protocol adapter 312 is designed to instantiate a new call instance 320 corresponding to the particular phone call and to route the message into the new call instance for further processing.

When a new call instance 320 is instantiated, for example by originating protocol adapter 312, an appropriate channel for the call is determined based on an analysis of the content of the incoming messages and the path by which the message arrived. The logic for selecting a channel may be static or dynamic. For example, static logic may be implemented by a hard-coded table in a configuration file resident in storage device 208, and dynamic logic may be set up at run-time based on such factors as channel availability. A combination of static and dynamic techniques may be used as well. The channel is associated with a particular terminating protocol adapter 316 and, hence, indicates the proper I/O channel controller 306 and protocol on the terminating side. The terminating protocol adapter 316 can route messages from associated call instances to the corresponding I/O channel controller 306, to a network node, and ultimately to the destination telephone. In accordance with the bi-directional nature of protocol adapters, a terminating protocol adapter 316 is configured also to receive protocol-specific messages from the terminating side of the network and pass them to the appropriate call instance. Likewise, an originating protocol adapter 312 can receive messages from a call instance 320 and pass them onto the corresponding I/O channel controller 302 for transmission to the appropriate destination.

An external protocol adapter 314 is a special kind of protocol adapter for interconnecting the protocol converter with an external system involved with the call. For example, the external protocol adapter 314 enables external systems to be involved in real-time Intelligent Networking (IN) call control such as Transaction Control Application Part (TCAP) communications with a C7 network Service Control Point (SCP). As another example, external protocol adapter 314 can employ a proprietary protocol for communicating with an external Fraud Control System involved in non-real-time control over the call. For implementing voice over packet-switching networks, the external protocol adapter 314 is used for real-time communication with a coding unit such as originating coding unit 110 and terminating coding unit 150. Accordingly, the external protocol adapter 314 is responsible for connecting with the appropriate I/O channel controller 304 in the I/O subsystem 300 for sending and receiving messages with the coding unit and routing the messages to and from the proper call instance 320. In addition, external protocol adapter 314 is capable of instantiating one or more new call instances based upon a message received from the external channel. In such an event, the other protocol adapters 312 and 316 are directed to initiate a call from a logical "originating" node to a terminating node.

A call instance 320 is instantiated by an originating protocol adapter 312 (or an external protocol adapter 314) for processing a call and performing protocol conversion, if necessary. A call instance 320 may be implemented in a variety of ways, including by a separate process, thread, or an interruptible flow of execution that can be resumed. When the call instance 320 is instantiated, memory for originating call control ("OCC") 322, universal call model ("UCM") 324, and terminating call control ("TCC") 326 is allocated and initialized. The call instance 320 also contains a call context 328, which is a region of memory for storing information about the current call. Some call-related information that persists beyond the duration of the call may be stored in a database in main memory 206 or storage device 208 to implement billing records.

Preferably, OCC 322, UCM 324, and TCC 326 are implemented as state machines by objects in an object-oriented programming language such as C++ or by other data structures in other programming languages. A state machine is an automaton that transitions from one of a finite number of states to another of those states in response to particular inputs. The output of a state machine occurs upon a state transition and is based on the destination state and typically also on the input and/or source state. The OCC 322, UCM 324, and TCC 326 state machines model a call from the perspective of the originating protocol, a universal protocol, and the terminating protocol, respectively.

OCC 322 models a call from the perspective of the originating protocol. More specifically, OCC 322 receives messages in the originating protocol from originating protocol adapter 312 and, in response, transitions from one state to another state, resulting in outputting a non-protocol specific (i.e., universal protocol specific) message to UCM 324. Conversely, OCC 322 receives non-protocol specific messages from UCM 324 and, by responsively transitioning from one state to another, outputs originating protocol specific messages to originating protocol adapter 312.

Likewise, TCC 326 models the call from the perspective of the terminating protocol. More specifically, TCC 326 receives non-protocol specific messages from UCM 324 and, by responsively transitioning from one state to another, outputs terminating protocol specific messages to terminating protocol adapter 312. Conversely, TCC 326 receives messages in the terminating protocol from terminating protocol adapter 316 and, in response, transitions from one state to another state, resulting in outputting a non-protocol specific (i.e., universal protocol specific) message to UCM 324.

UCM 324 manages the call according to a universal call model that uses the universal protocol produced by OCC 322 and TCC 326. For the most part, UCM 324 merely passes the universal protocol messages between the OCC 322 and TCC 326, thereby implementing a protocol conversion of the originating protocol into the terminating protocol via a universal protocol. UCM 324 may conditionally send messages to OCC 322 and TCC 326, however, based on the capabilities and requirements of the originating and terminating protocols, respectively. For example, some protocols require acknowledgement messages to be sent in response to a call setup message and others protocols do not. In this case, UCM 324 is configured to determine whether the originating protocol needs the acknowledgement message and cause one to be generated, if needed.

Since UCM 324 is positioned to intercept messages passed between the OCC 322 and the TCC 326, UCM 324 can perform different kinds of message processing other than mere protocol conversion. In accordance with one embodiment of the present invention, UCM 324 is configured to implement feature transparency. Specifically, if the primary communication network 130 is unable to handle a particular feature even after protocol conversion, UCM 324 arranges for the feature to be communicated over the auxiliary communication network 132 using external I/O channel controller 304, as described in more detail hereinafter.

A Common Signaling Protocol

In one embodiment, the signaling units 120 and 140 communicate with each other over a network connection 132 using a common signaling protocol, XISUP. The network connection 132 can be implemented over a packet-switching network. This common signaling protocol XISUP is an extension of Integrated Services Digital Network User Part (ISUP), which contains a universal call reference (UCR) in the message header for uniquely identifying the current voice call and a new Information Entity (IE) to carry coding unit related data between the signaling units. More specifically, the common protocol message header includes the fields listed in TABLE 1.

TABLE 1

FIELDS OF COMMON PROTOCOL MESSAGE HEADER

| Field | Length | Description |
| --- | --- | --- |
| Protocol ID | 1 | Designates the protocol type for this packet, useful for distinguishing from other Ethernet packets. |
| Version | 1 | Version of the common protocol, for facilitating a phase development. |
| Length | 2 | Number of bytes in the packet, not including the length of the Protocol ID or the Length field. |
| Dest. SU | 4 | Address of the signaling unit that this message is directed toward, for example, an IP address. |
| Org. SU | 4 | Address of the signaling unit that is sending this message, for example, an IP address. |
| UCR | 8 | The Universal Call Reference specifies a system-wide identifier for a call. The UCR is generated by the signaling unit that received the initial call set up for the call and is passed in all messages to identify the call in a signaling unit. |
| Msg Type | 1 | Message type, encoded according to existing ISUP message types (e.g., IAM, ACM, ANM, REL, and RLC). |
| Msg Data | variable | Message data, encoded according to the message type as per the existing ISUP specifications. |

Since the XISUP protocol is established for the facilitating integration and intercommunication between different signaling units on a packet-switching network for establishing voice call over the packet-switching network, the XISUP protocol need not support each and every ISUP message to achieve the desired functionality. However, the XISUP protocol preferably supports at least the following ISUP messages, with variation as explained herein, as set forth in TABLE 2.

TABLE 2

ISUP MESSAGES SUPPORTED BY XISUP PROTOCOL

| Message | Description |
| --- | --- |
| Initial Address Message (IAM) | Same as the ISUP IAM, except with a new IE for a Connection Descriptor, that includes the network address of the originating coding unit 110 in. |
| Address Complete Message (ACM) | Same as to the ISUP ACM, except with a new IE for the Connection Descriptor. |
| Subsequent Address Message (SAM) | Same as to the ISUP SAM. |
| Answer Message (ANM) | Same as to the ISUP ANM. |
| Release Message (REL) | Same as to the ISUP REL. |
| Release Complete Message (RLC) | Same as to the ISUP RLC. |

Establishing a Voice Call Over a Packet-switching Network

Figure 4:
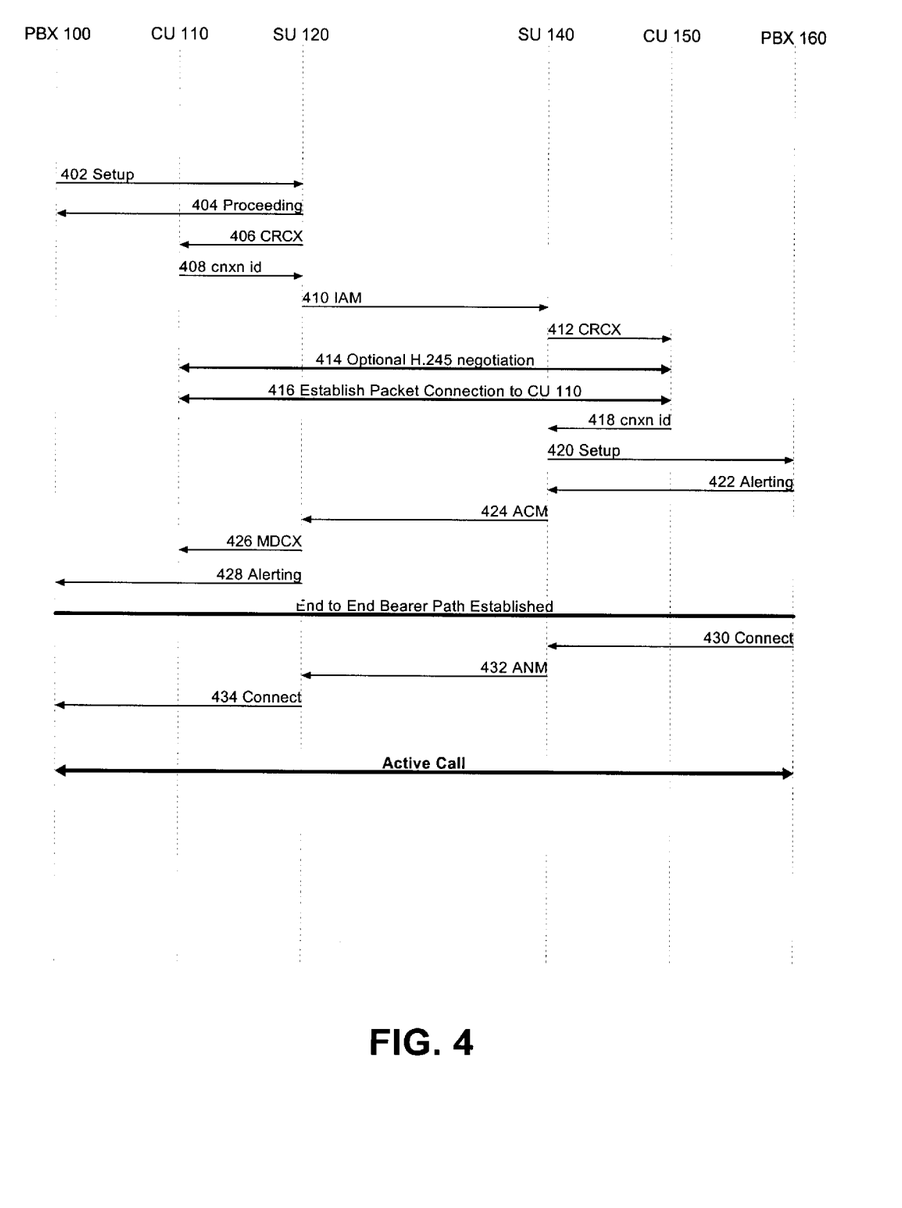
FIG. 4 is a call flow diagram illustrating an establishment of a voice call and voice call release over a packet-switching network.

FIG. 4 is a call flow diagram illustrating messages transmitted and received by originating coding unit 110, originating signaling unit 120, terminating signaling unit 140, terminating coding unit 150, in establishing a voice call between originating node 100 and terminating node 160 through a packet-switching network 130. The left side of FIG. 4 depicts the call flow of messages performed by originating node 100, originating coding unit 110, and originating signaling unit 120 on the originating side of the call. The right side of FIG. 4 depicts the call flow of messages performed by terminating signaling unit 140, terminating coding unit 150, and terminating node 160 on the terminating side of the call.

When a user initiates a voice call, a "setup" connection request message 402 is generated and ultimately transmitted by originating node 100 to originating coding unit 110, which grooms off and backhauls the signaling message to originating signaling unit 120 via backhaul signaling link 112. Alternatively, the set up message 420, in the case of SS7, is delivered directly to originating signaling unit 120 from the trunk via link 113. This setup connection request message is protocol-specific and varies from protocol to protocol. For example, in the DPNSS protocol, the connection request message is an ISRM_C message, but, as another example, the connection request message would be an Initial Address Message (IAM) in the Signaling System 7 (SS7) family of protocols. In yet another example, in the ISDN family of protocols such as ISDN_PRI, the connection request message is a Setup message. In most protocols, the connection request message contains a call identifier, an originating number, and a terminating number. The originating number may be the number of the originating telephone, and the terminating number may be altered in the course of determining the terminating telephone.

The setup connection request message 402, when received by originating signaling unit 120 through control channel 222 from originating coding unit 110 or directly from originating node 100, comes into I/O card 218c in communications interface 218. A corresponding I/O channel controller 302, executing as part of I/O subsystem 300 on computer system 200, unpacks the message into a protocol data unit and submits it to the corresponding, originating protocol adapter 312. Since this message is a set up connection request 402, the originating protocol adapter 312 cannot match the call identifier with an existing call instance. Consequently, the originating protocol adapter 312 instantiates a call instance containing OCC 122, UCM 124, and TCC 126 as specific embodiments of the OCC 322, UCM 324, and TCC 326 described above in connection with FIG. 3. Once the call instance is created, the protocol-specific connection request message is routed by the originating protocol adapter 312 to OCC 122.

OCC 122 of the originating signaling unit 120 is initially in an "idle" state. At point 402 in the call flow diagram, OCC 122 receives the protocol-specific connection request message from originating protocol adapter 312. In response, OCC 122 transitions from the idle state to a protocol-specific state generally indicative of waiting for a ring. For example, an OCC 122 implemented for the DPNSS protocol would enter a "wait for NAM" state. During the transition, OCC 122 performs various operations including the unpacking of the message into its component information, storing the information in the all context 328, and outputting of an internal, universal protocol "[Call]" message to UCM 124. In this example, the call context 328 includes, among other information, the originating telephone number, the destination telephone number, and a flag that indicates the presence of a feature. In this example, the feature flag is "false." Depending on the protocol, OCC 122 may perform other tasks such as sending back a "proceeding" message 404 to the originating node 100 to acknowledge that the setup message 402.

When the UCM 124 of originating signaling unit 120 received the universal protocol "[Call]" message, the UCM 124 selects the bearer channel to be seized by the coding unit based upon a bearer channel specifically requested or merely "preferred" in the setup message, or upon an available channel on the associated trunk (for example, T1 or E1 line). Accordingly, the UCM 124 generates and transmits a create connection message 406, specifying the bearer channel, through external protocol adapter 314, I/O channel controller 304, control link 114 to originating coding unit 110. The create connection message 406 can be implemented according to an appropriate protocol such as a CRCX message in the Simple Gateway Control Protocol (SGCP), a proposed International Engineering Task Force (IETF) standard submitted by Bellcore and Soliant Internet Systems.

In response to the create connection message 406, the originating coding unit 110 seizes an endpoint for a bearer channel specified in the create connection message 406 and associates a network address for the selected bearer channel, which can be an IP address plus a port number. The originating coding unit 110 thereupon responds back to the originating signaling unit 120 over the control link 114 with a message 408 that includes the network address of the originating coding unit 110. The create connection message 408 can also contain parameters that indicate the capabilities of the originating coding unit 110, for example, the encoding and compression types the originating coding unit 110 supports.

When this message 408 with the network address is received by the originating signaling unit 120, the originating signaling unit 120 resolves the call routing through network 132 to the terminating signaling unit 140, based on dynamic techniques, static techniques such as provisioned lookup tables, or a combination of dynamic and static techniques. Once the appropriate terminating signaling unit 140 is identified, TCC 126 of the originating signaling unit 120 generates and transmits an XISUP IAM message 410 to the terminating signaling unit 140 with the standard ISUP IAM information plus the Universal Call Reference and the network address of the bearer channel on the originating coding unit 110.

Upon receipt of the XISUP LAM message 410 from the originating signaling unit 120, the terminating signaling unit 140 resolves the call routing down to the terminating coding unit 150 and terminating node 160 level. In addition, the terminating signaling unit 140 issues a CRCX message 412 via SGCP and control link 154 to terminating coding unit 150 for setting up a connection from the endpoint for terminating node 160 to the bearer channel port of the originating coding unit 110. In addition, the CRCX message 412 may contain the parameters that indicate the capabilities of the originating coding unit 110.

The terminating coding unit 150 optionally initiates an H.245 negotiation session 414 with the originating coding unit 110 using the network address of the bearer channel on the originating coding unit 110 passed in the CRCX message 412. During the negotiation session 414, the originating coding unit 110 and the terminating coding unit 150 negotiate appropriate compression and decoding levels. Alternatively, the terminating coding unit 150 may use the capability parameters of the originating coding unit 110 in the CRCX message 412 and its own capabilities parameters to determine the common capabilities. Accordingly, the terminating coding unit 150 establishes a bearer channel circuit 416 on the bearer packet-switching network 130. The bearer channel circuit 416 may be one-way (terminating coding unit 150 to originating coding unit 110) or two-way. If successful, the terminating coding unit 150 responds back with a connection message 418 to terminating signaling unit 140 over control link 154. The connection message 418 contains the network address of the terminating coding unit 150 and the negotiated parameters or the common capabilities as determined above.

Upon successful setup of the bearer channel or virtual circuit between the originating coding unit 110 and the terminating coding unit 150 as indicated by the connection message 418, the terminating signaling unit 140 sends a call setup message 420 via backhaul signaling link 152 to the terminating node 160. In response, the terminating node 160 sends an alerting message 422, backhauled to the terminating signaling unit 140, which is converted to an XISUP ACM message 424 to the originating signaling unit 120. The XISUP ACM message 424 contains the standard ISUP ACM information plus the results of the H.245 negotiation, and for unidirectional protocols, such as RTP, the network address of the terminating coding unit 150.

Thereupon, the originating signaling unit 120 generates and sends a modify connection request MDCX message 426 to the originating coding unit 110 to cross connect the user side bearer with the network side bearer and thereby set up an end to end bearer path. The MDCX message 426 also contains the parameters negotiated between the originating coding unit 110 and the terminating coding unit 150. If the earlier establishment of the bearer channel 416 was one-way, then the connection is modified to include the reverse direction (from originating coding unit 110 to terminating coding unit 150), thereby becoming a bi-directional connection. In addition, in response to the ACM message 424, the originating signaling unit 120 sends an Alerting message 428 to originating node 100.

When the person being called picks up the ringing telephone, this action results in the terminating node 160 sending a connect message 430 to the terminating coding unit 150. The connect message 430 is backhauled to the terminating signaling unit 140, which sends in response an XISUP ANM message 432 to the originating signaling unit 120. The originating signaling unit 120, in response, generates and transmits via the backhaul signaling link 112 a connect message 434 to the originating node 100 and ultimately to the originating telephone. At this point, the voice call is active.

Extensions and Alternatives

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. For example, an originating signaling unit can control multiple originating coding units, a terminating signaling unit can control multiple terminating coding units, and a single signaling unit can control an originating coding unit and a terminating coding unit, even on the same voice call.

Figure 5A:
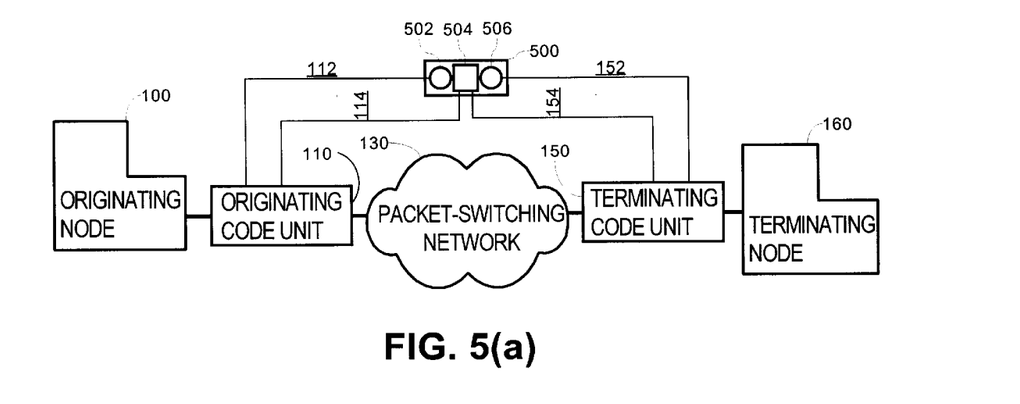

As one example, FIG. 5(a) illustrates a configuration wherein a single signaling unit 500 handles the voice call signaling processing for both the originating coding unit 110 and the terminating coding unit 150. In this configuration, the OCC 502 is responsible for communicating the signaling data with the originating coding unit 110 over link 112, and the TCC 506 is responsible for communicating the signaling data with the terminating coding unit 150 over link 152. The UCM 504 is responsible for controlling and querying the originating coding unit 110 over link 114 and the terminating coding unit 150 over link 154.

Figure 5B:
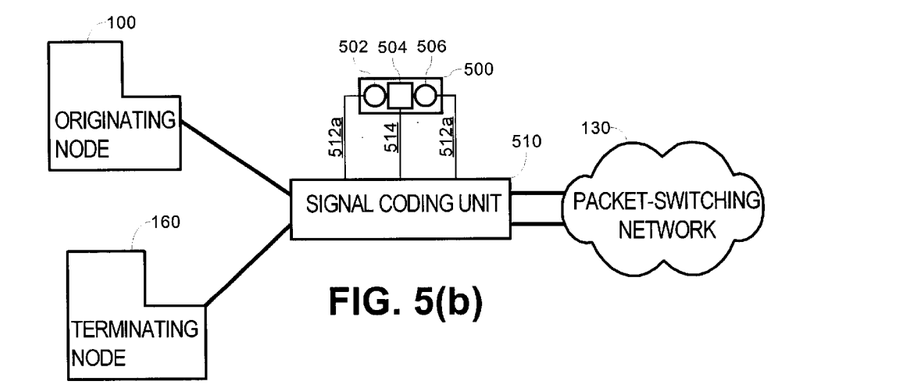
Figure 5C:
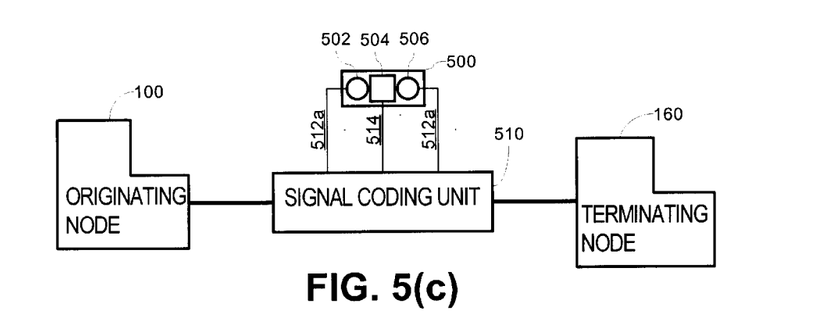

Referring to FIG. 5(b), a single coding unit 510 can be controlled by a single signaling unit 500, wherein the coding unit 510 uses an external connection through packet-switching network 130 to connect the originating and terminating channels. This connection can even be internal as shown in FIG. 5(c).

What is claimed is:

1. A method of establishing a voice call bearing voice data through a packet-switching network, comprising:
    receiving signaling data for establishing the voice call;
    obtaining a network address of a coding unit in the packet-switching network by
        transmitting, in response to receiving the signaling data, a first message to the coding unit requesting the network address of the coding unit, and
        receiving a second message from the coding unit containing the network address of the coding unit; and
    causing, based on the network address of the coding unit in the packet-switching network, a bearer channel to be established for carrying the voice data through the packet-switching network.

2. The method of claim 1, wherein causing, based on the network address of the coding unit in the packet-switching network, a bearer channel to be established for carrying the voice data through the packet-switching network includes transmitting the signaling data and the network address of the coding unit to a signaling apparatus.

3. The method of claim 2, wherein:
    receiving the signaling data includes receiving the signaling data at a signaling apparatus from the coding unit; and
    transmitting the signaling data and the network address of the coding unit includes transmitting the signaling data and the network address of the coding unit from the signaling apparatus.

4. The method of claim 2, wherein causing, based on the network address of the coding unit in the packet-switching network, a bearer channel to be established for carrying the voice data through the packet-switching network includes transmitting a control message to the signaling apparatus, wherein the control message includes the network address of the coding unit.

5. A computer-readable medium for establishing a voice call bearing voice data through a packet-switching network, the computer-readable medium carrying one or more sequences of instructions which, when executed by one or more processors, cause the one or more processors to perform the steps of:
    receiving signaling data for establishing the voice call;
    obtaining a network address of a coding unit in the packet-switching network by
        transmitting, in response to receiving the signaling data, a first message to the coding unit requesting the network address of the coding unit, and
        receiving a second message from the coding unit containing the network address of the coding unit; and
    causing, based on the network address of the coding unit in the packet-switching network, a bearer channel to be established for carrying the voice data through the packet-switching network.

6. The computer-readable medium of claim 5, wherein causing, based on the network address of the coding unit in the packet-switching network, a bearer channel to be established for carrying the voice data through the packet-switching network includes transmitting the signaling data and the network address of the coding unit to a signaling apparatus.

7. The computer-readable medium of claim 6, wherein:
    receiving the signaling data includes receiving the signaling data at a signaling apparatus from the coding unit; and
    transmitting the signaling data and the network address of the coding unit includes transmitting the signaling data and the network address of the coding unit from the signaling apparatus.

8. The computer-readable medium of claim 6, wherein causing, based on the network address of the coding unit in the packet-switching network, a bearer channel to be established for carrying the voice data through the packet-switching network includes transmitting a control message to the signaling apparatus, wherein the control message includes the network address of the coding unit.

9. An apparatus for establishing a voice call bearing voice data through a packet-switching network, the apparatus being configured to:
    receive signaling data for establishing the voice call;
    obtain a network-address of a coding unit in the packet-switching network by
        transmitting, in response to receiving the signaling data, a first message to the coding unit requesting the network address of the coding unit, and
        receiving a second message from the coding unit containing the network address of the coding unit; and
    cause, based on the network address of the coding unit in the packet-switching network, a bearer channel to be established for carrying the voice data through the packet-switching network.

10. The apparatus of claim 9, wherein the apparatus is further configured to transmit the signaling data and the network address of the coding unit to a first signaling apparatus.

11. The apparatus of claim 10, wherein:
    the apparatus is a second signaling apparatus that is configured to receive the signaling data from the coding unit.

12. The apparatus of claim 10, wherein the apparatus is further configured to transmit a control message to the first signaling apparatus, wherein the control message includes the network address of the coding unit.

13. An apparatus for establishing a voice call bearing voice data through a packet-switching network, the apparatus comprising:

means for receiving signaling data for establishing the voice call;

means for obtaining a network address of a coding unit in the packet-switching network by transmitting, in response to receiving the signaling data, a first message to the coding unit requesting the network address of the coding unit, and receiving a second message from the coding unit containing the network address of the coding unit; and means for causing, based on the network address of the coding unit in the packet-switching network, a bearer channel to be established for carrying the voice data through the packet-switching network.

14. The apparatus of claim 13, wherein the means for causing, based on the network address of the coding unit in the packet-switching network, a bearer channel to be established for carrying the voice data through the packet-switching network includes means for transmitting the signaling data and the network address of the coding unit to a signaling apparatus.

15. The apparatus of claim 14, wherein:

the means for receiving the signaling data includes means for receiving the signaling data at a signaling apparatus from the coding unit; and the means for transmitting the signaling data and the network address of the coding unit includes means for transmitting the signaling data and the network address of the coding unit from the signaling apparatus.

16. The apparatus of claim 14, wherein the means for causing, based on the network address of the coding unit in the packet-switching network, a bearer channel to be established for carrying the voice data through the packet-switching network includes means for transmitting a control message to the signaling apparatus, wherein the control message includes the network address of the coding unit.

17. A method of establishing a voice call bearing voice data through a packet-switching network, comprising:

receiving both signaling data for establishing the voice call and a network address of a first coding unit in the packet-switching network; and in response to receiving both the signaling data for establishing the voice call and the network address of a first coding unit in the packet-switching network, signaling a second coding unit to cause a bearer channel to be established for carrying the voice data through the packet-switching network.

18. The method of claim 17, wherein the signaling data and the network address of first coding unit are received over a voice call signaling network.

19. The method of claim 18, wherein the signaling data and the network address of first coding unit are received from a signaling apparatus over the voice call signaling network.

20. The method of claim 18, wherein the signaling data and the network address of first coding unit are received at a signaling apparatus over the voice call signaling network.

21. A computer-readable medium for establishing a voice call bearing voice data through a packet-switching network, the computer-readable medium carrying one or more sequences of instructions which, when executed by one or more processors, cause the one or more processors to perform the steps of:

receiving both signaling data for establishing the voice call and a network address of a first coding unit in the packet-switching network; and in response to receiving both the signaling data for establishing the voice call and the network address of a first coding unit in the packet-switching network, signaling a second coding unit to cause a bearer channel to be established for carrying the voice data through the packet-switching network.

22. The computer-readable medium of claim 21, wherein the signaling data and the network address of first coding unit are received over a voice call signaling network.

23. The computer-readable medium of claim 22, wherein the signaling data and the network address of first coding unit are received from a signaling apparatus over the voice call signaling network.

24. The computer-readable medium of claim 22, wherein the signaling data and the network address of first coding unit are received at a signaling apparatus over the voice call signaling network.

25. An apparatus for establishing a voice call bearing voice data through a packet-switching network, the apparatus being configured to:

receive both signaling data for establishing the voice call and a network address of a first coding unit in the packet-switching network; and in response to receiving both the signaling data for establishing the voice call and the network address of a first coding unit in the packet-switching network, signal a second coding unit to cause a bearer channel to be established for carrying the voice data through the packet-switching network.

26. The apparatus of claim 25, wherein the signaling data and the network address of first coding unit are received over voice call signaling network.

27. The apparatus of claim 26, wherein the signaling data and the network address of first coding unit are received from a signaling apparatus over the voice call signaling network.

28. The apparatus of claim 26, wherein the signaling data and the network address of first coding unit are received at a signaling apparatus over the voice call signaling network.

29. An apparatus for establishing a voice call bearing voice data through a packet-switching network, the apparatus comprising:

means for receiving both signaling data for establishing the voice call and a network address of a first coding unit in the packet-switching network; and means for, in response to receiving both the signaling data for establishing the voice call and the network address of a first coding unit in the packet-switching network, signaling a second coding unit to cause a bearer channel to be established for carrying the voice data through the packet-switching network.

30. The apparatus of claim 29, further comprising means for receiving the signaling data and the network address of first coding unit over a voice call signaling network.

31. The apparatus of claim 30, further comprising means for receiving the signaling data and the network address of first coding unit at a signaling apparatus over the voice call signaling network.

32. The apparatus of claim 30, further comprising means for receiving the signaling data and the network address of first coding unit at a signaling apparatus over the voice call signaling network.

* * * * *

UNITED STATES PATENT AND TRADEMARK OFFICE
CERTIFICATE OF CORRECTION

PATENT NO. : 6,768,733 B1
DATED : July 27, 2004
INVENTOR(S) : Shankar, Udaya et al.

It is certified that error appears in the above-identified patent and that said Letters Patent is hereby corrected as shown below:

Column 16,
Line 42, "network-address" should read -- network address --.

Signed and Sealed this

Twenty-third Day of November, 2004

JON W. DUDAS
*Director of the United States Patent and Trademark Office*